(12) United States Patent
Murg et al.

(10) Patent No.: US 8,307,848 B2
(45) Date of Patent: Nov. 13, 2012

(54) FREEZE RESISTANT MANIFOLD ASSEMBLY AND SYSTEM

(75) Inventors: Larry Murg, Aurora, OH (US); Michael Joseph Giacoma, Painesville, OH (US)

(73) Assignee: AeroControlex Group, Inc., Painesville, OH (US)

( * ) Notice: Subject to any disclaimer, the term of this patent is extended or adjusted under 35 U.S.C. 154(b) by 656 days.

(21) Appl. No.: 12/483,666

(22) Filed: Jun. 12, 2009

(65) Prior Publication Data

US 2010/0313966 A1    Dec. 16, 2010

(51) Int. Cl.
*E03B 7/07* (2006.01)
*E03B 7/10* (2006.01)
*F16K 37/00* (2006.01)
*F16K 21/04* (2006.01)
*F16K 17/04* (2006.01)
*F16K 15/06* (2006.01)

(52) U.S. Cl. .............. 137/556; 137/59; 137/60; 137/61; 137/542; 138/31

(58) Field of Classification Search .................... 137/59, 137/60, 61, 542, 556; 138/27, 31, 30
See application file for complete search history.

(56) References Cited

U.S. PATENT DOCUMENTS

| | | | |
|---|---|---|---|
| 168,192 A * | 9/1875 | Smith et al. | 137/542 |
| 4,274,435 A * | 6/1981 | Block | 137/508 |
| 4,682,625 A * | 7/1987 | Christopher | 137/538 |
| 5,261,440 A | 11/1993 | Frank | |
| 5,411,053 A | 5/1995 | Markham et al. | |
| 6,363,960 B1 * | 4/2002 | Gauss | 137/60 |
| RE38,686 E * | 1/2005 | Loblick | 392/397 |
| 2004/0221894 A1 | 11/2004 | Henley et al. | |
| 2005/0104371 A1 * | 5/2005 | Atkinson | 285/133.11 |
| 2005/0109793 A1 | 5/2005 | Thomas | |

* cited by examiner

*Primary Examiner* — Craig Schneider
*Assistant Examiner* — Atif Chaudry
(74) *Attorney, Agent, or Firm* — Baker & Hostetler LLP

(57) ABSTRACT

A freeze resistant manifold includes a plurality of conduits, junction, and expansion device. Each conduit of the plurality of conduits includes a respective first end in fluid communication with a respective second end. The junction is defined by each of the respective first ends of the plurality of conduits in direct fluid communication with a remainder of the first ends of the plurality of conduits. The expansion device includes a housing, plug, and linear actuator. The housing has a first housing end and a second housing end. The first housing end is in fluid communication with the junction. The plug is disposed between the first housing end and the second housing end. The plug has a substantially fluid-tight, sliding engagement with an inner wall of the housing. The linear actuator is to urge the plug towards the first housing end with a predetermined amount of force. The plug is held proximal to the first housing end by the linear actuator in response to a fluid pressure in the junction being less than a predetermined normal working pressure. The plug is moved towards the second end in response to the fluid pressure in the junction exceeding the predetermined normal working pressure.

17 Claims, 5 Drawing Sheets

FREEZE RESISTANT MANIFOLD ASSEMBLY AND SYSTEM

FIELD OF THE INVENTION

The disclosure generally relates to a manifold, and more particularly to a freeze resistant manifold assembly and system.

BACKGROUND OF THE INVENTION

Pipes or other such conduits for conveying fluids are often subject to temperature extremes. In some instances, these temperature extremes may cause damage to the conduits and/or other components of a fluid supply system such as tanks, fittings, manifolds, and the like. Where possible, insulation and/or auxiliary heating/cooling systems may help protect the fluid supply system and the fluid therein. Unfortunately, insulation is typically bulky or otherwise impractical in some instances and heating/cooling systems require energy input and may not be sufficiently reliable for some applications.

Accordingly, it is desirable to provide a manifold assembly and system capable of overcoming the disadvantages described herein at least to some extent.

SUMMARY OF THE INVENTION

The foregoing needs are met, to a great extent, by the present invention, wherein in some embodiments a freeze resistant assembly and system is provided.

An embodiment of the present invention relates to a freeze resistant manifold. The freeze resistant manifold includes a plurality of conduits, junction, and expansion device. Each conduit of the plurality of conduits includes a respective first end in fluid communication with a respective second end. The junction is defined by each of the respective first ends of the plurality of conduits in direct fluid communication with a remainder of the first ends of the plurality of conduits. The expansion device includes a housing, plug, and linear actuator. The housing has a first housing end and a second housing end. The first housing end is in fluid communication with the junction. The plug is disposed between the first housing end and the second housing end. The plug has a substantially fluid-tight, sliding engagement with an inner wall of the housing. The linear actuator is to urge the plug towards the first housing end with a predetermined amount of force. The plug is held proximal to the first housing end by the linear actuator in response to a fluid pressure in the junction being less than a predetermined normal working pressure. The plug is moved towards the second end in response to the fluid pressure in the junction exceeding the predetermined normal working pressure.

Another embodiment of the present invention pertains to a fluid supply system for an aircraft. The fluid supply system includes a fluid storage tank, main line to draw a fluid from the storage tank, first fixture, first supply line to supply the fluid to the first fixture, second fixture, second supply line to supply the fluid to the second fixture, and freeze resistant manifold. The freeze resistant manifold includes a junction and expansion device. The junction is to directly fluidly connect the main line to the first supply line and the second supply line. The expansion device includes a housing, plug, and linear actuator. The housing has a first housing end and a second housing end. The first housing end is in fluid communication with the junction. The plug is disposed between the first housing end and the second housing end. The plug has a substantially fluid-tight, sliding engagement with an inner wall of the housing. The linear actuator is to urge the plug towards the first housing end with a predetermined amount of force. The plug is held proximal to the first housing end by the linear actuator in response to a fluid pressure in the junction being less than a predetermined normal working pressure. The plug is moved towards the second end in response to the fluid pressure in the junction exceeding the predetermined normal working pressure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
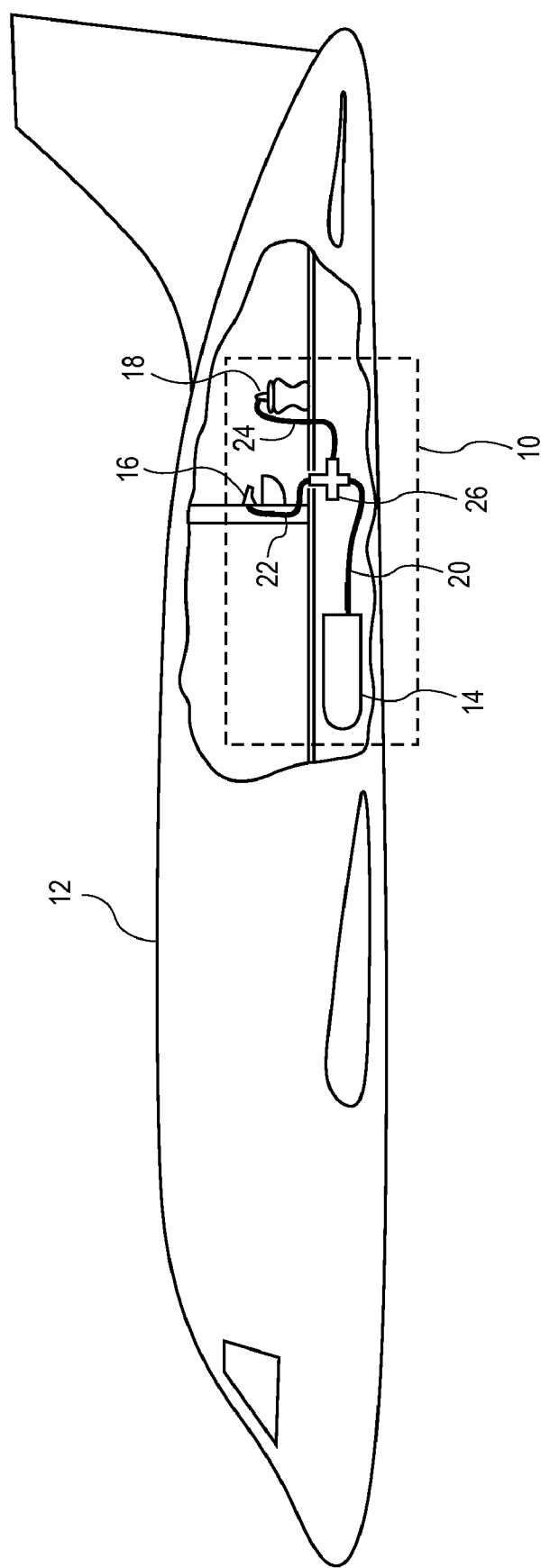
FIG. 1 is a simplified view of an interior of an aircraft showing a fluid supply system suitable for use with an embodiment of the invention.

The invention will now be described with reference to the drawing figures, in which like numerals refer to like parts throughout. FIG. 1 is a simplified view of a fluid supply system 10 disposed in an aircraft 12. The aircraft 12 and other vehicles are particularly suitable for embodiments of the invention due to the relatively close tolerances, power savings, and reliability of the various embodiments of the invention. As shown in FIG. 1, the fluid supply system 10 includes a supply tank 14, fixture 16, fixture 18, main line 20, supply lines 22 and 24, and manifold 26.

The fluid supply system 10 provides fluid for the aircraft 12 and/or users of the aircraft 12. In a particular example, the fluid supply system 10 stores and provides water for the fixtures 16 and 18, such as a faucet and toilet. Under typical working pressures, the fluid supply system 10 may be pressurized from about 35 pounds per square inch (psi) (24,607 kilogram per square meter (kg/m$^2$)) to about 50 psi (35,153 kg/m$^2$). As is generally known, water expands as the temperature approaches the freezing point (32° F./0° C.). This expansion, if not accounted for, may raise the pressure to more than 5000 psi (351,500 kg/m$^2$).

The supply tank 14 stores and supplies fluid for the fluid supply system 10. In a particular example, the supply tank 14 is configured to store water. To store and supply water, the supply tank 14 generally includes a conventional overfill preventor device that prevents the supply tank 14 from being filled more than a predetermined fill amount. The predetermined fill amount is typically about 80% of the total tank volume which allows for about 20% head volume for the freezing water to expand into.

The fixtures 16 and 18 provide control of a flow of the fluid. For example, the fixture 16 may include a faucet with a valve to control the flow of the fluid therethrough. In another example, the fixture 18 may include a toilet, also having a valve, to initiate, control, and stop the flow of the fluid. In other examples, the fixture 16 and/or 18 may include a plumbed coffee brewing device and the like.

The main line 20 and supply lines 22 and 24 convey the fluid from the fluid supply tank 14 to the fixtures 16 and 18. The main line 20 and supply lines 22 and 24 are conventionally fabricated from a relatively flexible material. The flexibility of the material allows the main line 20 and supply lines 22 and 24 to stretch about 10-20% and accommodate the expansion of water that freezes therein.

The manifold 26 connects the main line 20 to the supply lines 22 and 24. As used herein, the term, "manifold" refers to a device or arrangement of conduits to redistribute a flow of fluid. Typically, a manifold may redistribute a flow of the fluid from a single inlet to a plurality of outlets or vise versa. In the particular example shown in FIG. 1, the manifold 26 connects the main line 20 (the inlet) to the supply lines 22 and 24. However, in general, the manifold 26 may connect one or more conduits to any suitable number of outlets.

The manifold 26 may be fabricated from one or more suitable materials. Examples of suitable materials include metals, polymers, resins, composites, and the like. In addition, as shown herein, the manifold 26 includes components, each of which may be made from one or more suitable materials. As described herein with respect to the particular components, suitable materials may include: various metals and particularly aerospace metals and metal alloys; elastomers; polymers such as cross-linked polyethylene and various plastics and resins; composites such as fiber reinforced plastics; and the like.

Figure 2:
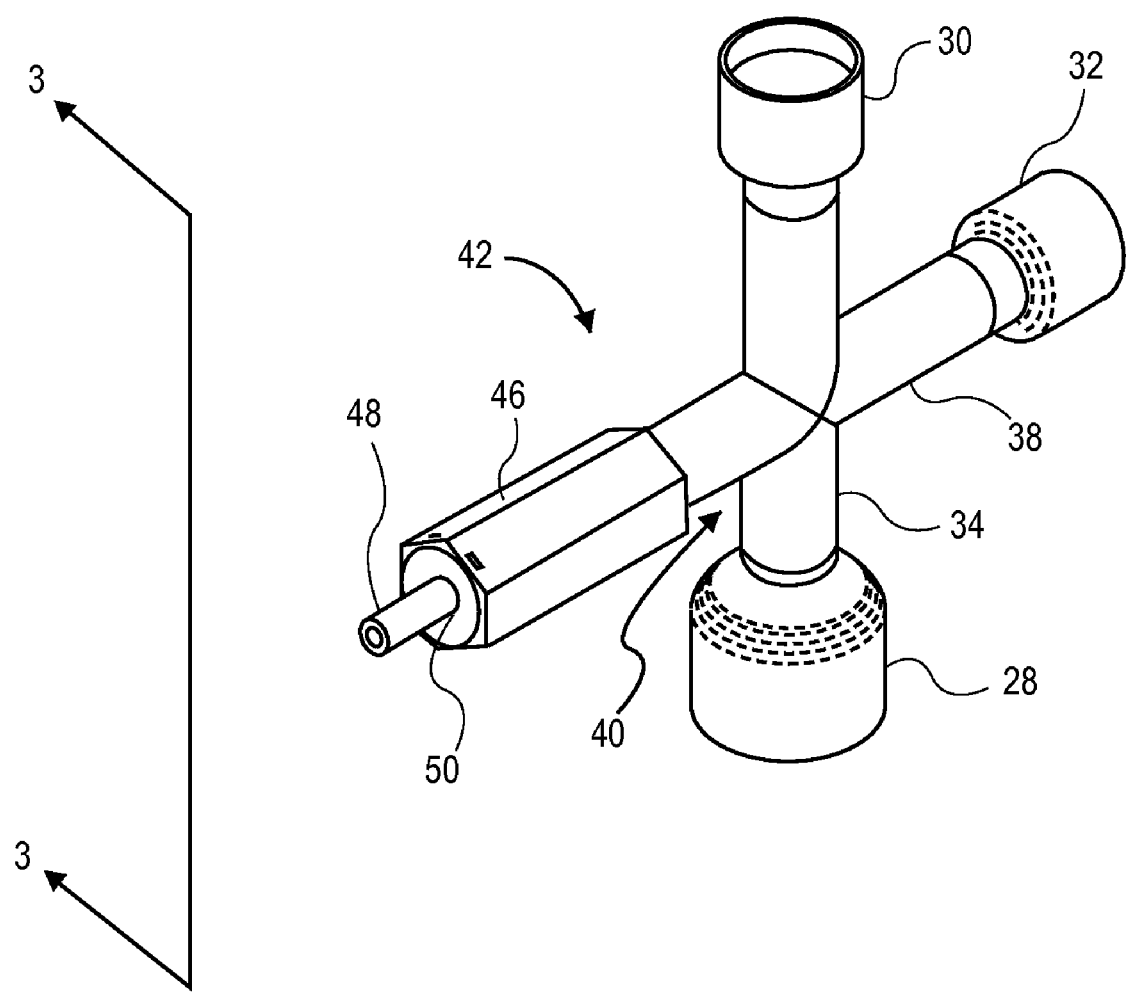
FIG. 2 is a perspective view of a manifold according to an embodiment of the invention.

FIG. 2 is a perspective view of the manifold 26 according to an embodiment of the invention. As shown in FIG. 2, the manifold 26 includes a plurality of fittings 28, 30, and 32 disposed at respective ends of a plurality of conduits 34, 36, and 38. The conduits 34, 36, and 38 are joined at a junction 40. The fittings 28, 30, and 32 are to connect the manifold 26 to the main line 20 and supply lines 22 and 24. In a particular example, the main line 22 (shown in FIG. 1) is secured to the manifold 26 at the fitting 28 and the supply lines 22 and 24 (shown in FIG. 1) are secured to the manifold 26 at the fittings 30 and 32, respectively. The main line 22 and supply lines 22 and 24 may be secured to the fittings 28-32 in any suitable manner. Examples of suitable attachment methods include threaded engagement, adhesives, welding, friction or compression fit, flange-type fitting, other such mechanical fastening, or the like. In addition, in this or other embodiments, the fittings 28-32 and/or conduits 34-38 may be optional. For example, the fittings 28-32 may be directly joined to form the junction 40 or the main line 22 and supply lines 22-24 may be directly joined to form the junction 40.

The manifold 26 also includes an expansion device 42 disposed or joined at the junction 40. The expansion device 42 includes a housing 44, end cap 46, and guide rod 48. The guide rod 48 is optional and, if included, may extend out of the end cap 46 through a witness port 50. As described herein, the expansion device 42 provides an expandable chamber or volume into which water and/or ice can expand. It is an advantage of embodiments of the invention, that by locating the expansion device 42 at or near the junction 40, expanding fluid that may have otherwise damaged the fittings 28-32 or junction 40 may be directed into or otherwise allowed to expand into the expansion device 42.

Figure 3:
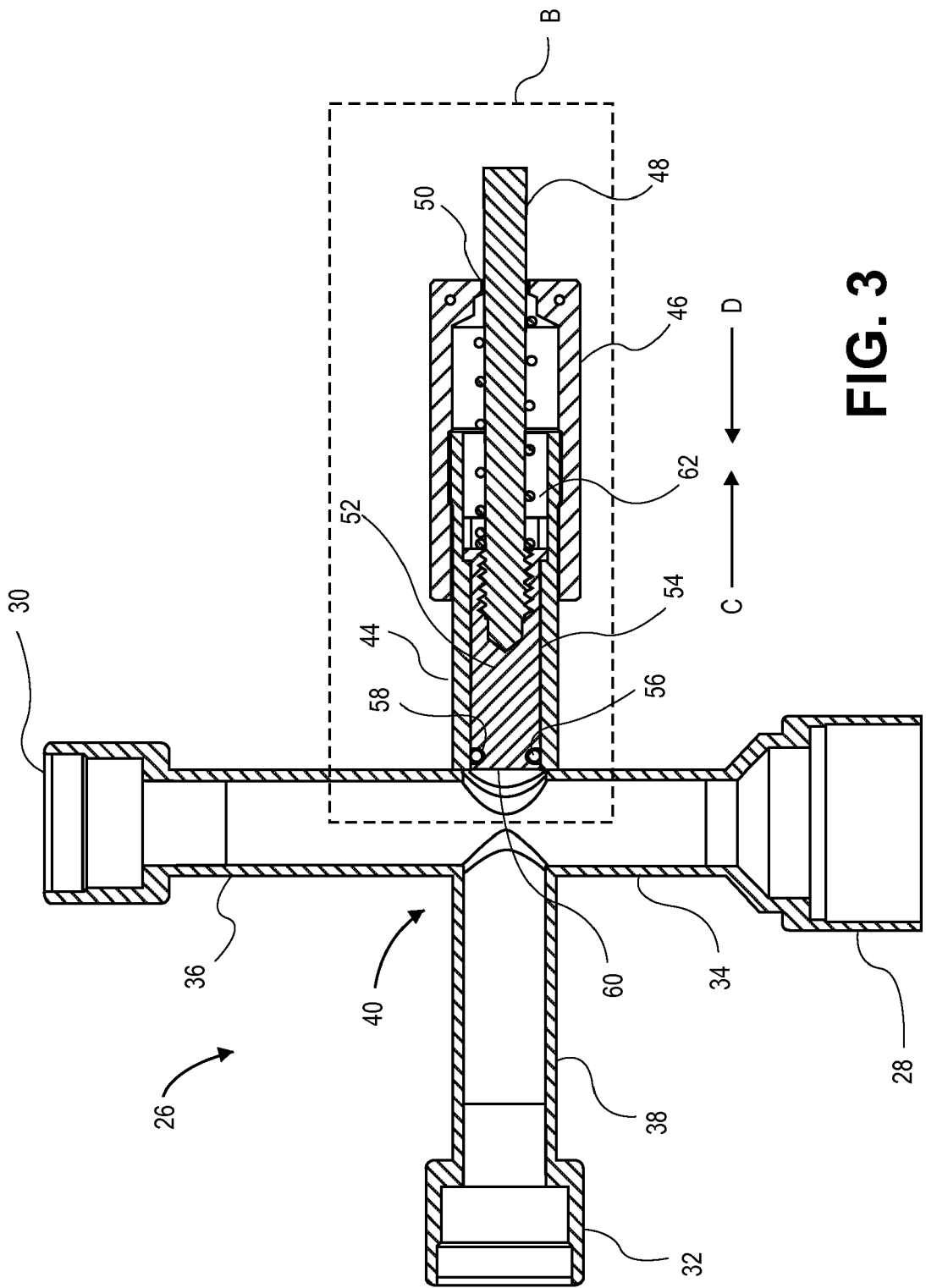
FIG. 3 is a cross sectional view 3-3 of the manifold according to FIG. 2.

FIG. 3 is a cross sectional view 3-3 of the manifold according to FIG. 2. As shown in FIG. 3, the expansion device 42 includes a plug 52 disposed in the housing 44. The plug 52 may move within the housing 44 to provide volume for expanding fluid to flow into. In a particular example, the plug 52 is in sliding engagement with a housing bore 54. The plug 52 may provide a substantially fluid-tight sliding seal within the housing bore 54. The substantially fluid-tight sliding seal is generally sufficient to limit or prevent fluid from flowing between the plug 52 and the housing bore 54. More particularly, the plug 52 may include one or more O-rings 56 captured by one or more corresponding annular grooves 58 disposed in the plug 52. The O-ring 56 may include one or more of elastomers such as synthetic resinous fluorine-containing polymers, silicone and fluorosilicones, nitrile, butyl, urethane, and the like.

In a specific example shown in FIG. 3, the plug 52 includes one annular groove 58 disposed at or near an end of the plug 52 that is proximal to the junction 40. This proximal end of the plug 52 includes a plug face 60 in fluid communication with the junction 40. The fittings 28-32 and conduits 34-38 are also in fluid communication with the junction 40 and to each other via the junction 40. It is an advantage of this embodiment of the invention that the close proximity of the annular groove 58 and O-ring 56 to the junction 40 reduces infiltration of fluid between the housing 44 and the plug 52.

Fluid pressure in the junction 40 exerts a force $F_{fluid}$ upon the plug face 60 to urge the plug 52 to slide in the housing bore 54 in direction C. Opposing the $F_{fluid}$ is a linear actuator 62 urging the plug 52 in direction D. The linear actuator 62 exerts a force $F_{actuator}$ upon the plug 52. The linear actuator 62 includes any suitable device for exerting the $F_{actuator}$ upon the plug 52. Suitable examples include springs, pneumatic actuators, and the like. In a particular example, the linear actuator 62 includes a helically wound spring as shown in FIG. 3 The $F_{actuator}$ is based upon a variety of factors such as, for example: working pressure of the fluid supply system 10; maximum recommended pressure of the fluid supply system 10; manufacturers specification; empirical data; and the like. In a particular example, the $F_{actuator}$ may be in a range of about 35 psi (24,607 kg/m$^2$) to about 500 psi (351,534 kg/m$^2$). More particularly, the $F_{actuator}$ may be in a range of about 60 psi (42,184 kg/m$^2$) to about 200 psi (140,613 kg/m$^2$).

Figure 4:
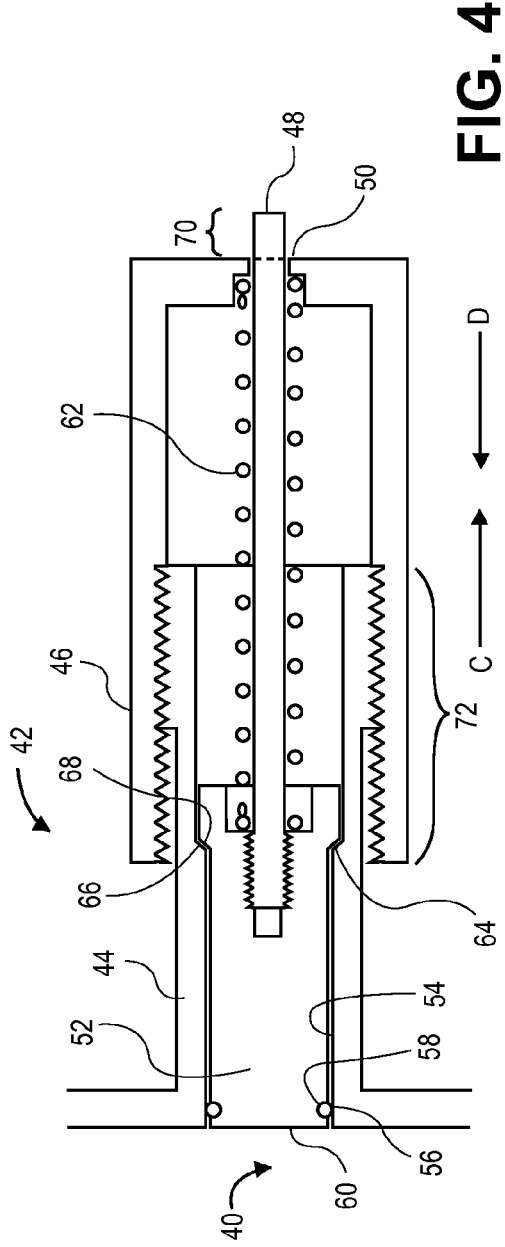
FIG. 4 is a view of detail B of an expansion device in a working pressure conformation according to FIG. 3.

FIG. 4 is a view of detail B of the expansion device 42 in a working pressure conformation according to FIG. 3. As shown in FIG. 4, the expansion device 42 includes a stop 64 to impede or prevent the plug 52 from extending out from the housing 44 and into the junction 40. In a particular example, the stop 64 includes an annular bearing surface 66 disposed in the housing bore 54 and opposing annular bearing surface 68 disposed on the plug 52. The stop 64 is to arrest movement of the plug 52 in direction D in response to the plug 52 achieving a predetermined position in the housing 44. For example, in response to $F_{actuator} > F_{fluid}$, the plug 52 is urged in direction D until the annular bearing surface 66 bears upon the annular bearing surface 68. It is an advantage of this and other embodiments that the stop 64 prevents the O-ring 56 from extending into the junction 40, loosing contact with the housing bore 54, and allowing fluid to flow into the expansion device 42 from the junction 40.

Figure 5:
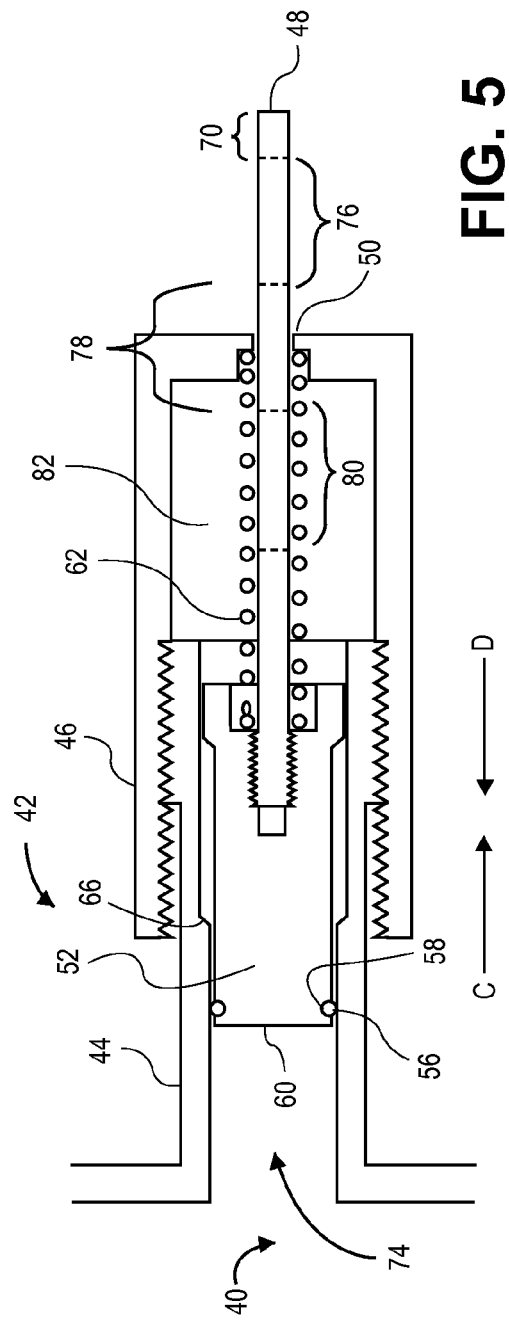
FIG. 5 is a view of detail B of the expansion device in an overpressure conformation according to FIG. 3.

It is another advantage of this and other embodiments of the invention that the guide rod 48 provides an indication of the fluid pressure and the witness port 50 provides an indication of the functionality of the expansion device 42. For example, the guide rod 48 may include an indicator 70, indicating that the fluid pressure is at or below a predetermined operating pressure. In a particular example, the indicator 70 may include green coloring, symbols, numbering, and/or lettering sufficient to convey the fluid pressure is at or below the predetermined operating pressure. As shown in FIG. 5, the guide rod 48 may include one or more additional indicators that the predetermined operating pressure is exceeded.

The expansion device 42 may further include an adjustable or threaded portion 72 to mate the housing 44 to the end cap 46. By rotating the end cap 46 relative to the housing 44, the end cap 46 may advance or withdrawal the end cap 46 along the housing 44. In this manner, the linear actuator 62 may be compressed or expanded, respectively, which may increase or reduce, respectively, the $F_{actuator}$. If the end cap 46 is withdrawn sufficiently, the end cap 46 may be removed to disassemble the expansion device 42 for service, for example.

FIG. 5 is a view of detail B of the expansion device 42 in an overpressure conformation according to FIG. 3. As shown in FIG. 5, the fluid pressure in the junction 40 has urged the plug 52 in direction C. In response to this movement, a chamber 74 is generated in the housing 44. Also shown in FIG. 5, the guide rod 48 may include additional indicators 76-80 of the predetermined operating pressure being exceeded. For example, the indicator 76 may include yellow coloring, symbols, numbering, and/or lettering sufficient to convey the fluid pressure is above the predetermined operating pressure. The indicator 78 may include orange coloring, symbols, numbering, and/or lettering sufficient to convey the fluid pressure is substantially above the predetermined operating pressure. The indicator 80 may include red coloring, symbols, numbering, and/or lettering sufficient to convey the fluid pressure has exceeded a predetermined maximum pressure. In this regard, in response to the plug 52 being advanced into the housing 44 such that the O-ring 56 moves past the annular bearing surface 66, the fluid may flow past the O-ring 56, into a chamber 82, and out of the witness port 50.

It is an advantage of this and other embodiments of the invention that the witness port 50 provides an indicator of the working condition of the expansion device 42. For example, in response to a worn or otherwise damaged O-ring 56 and/or housing bore 54, fluid may seep into the chamber 82 and out the witness port 50.

Figure 6:
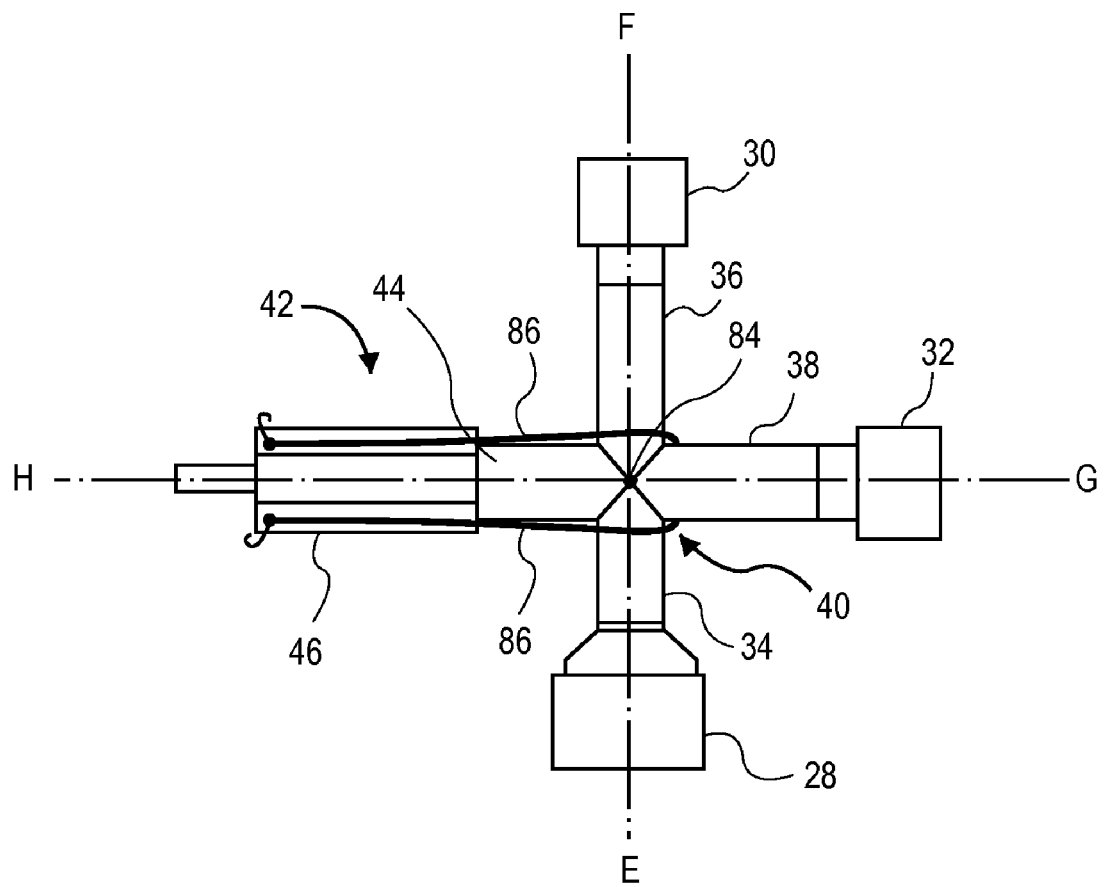
FIG. 6 is a side view of the manifold according to FIG. 2.

FIG. 6 is a side view of the manifold 26 according to FIG. 2. As shown in FIG. 6, the conduit 34/fitting 28 includes a central axis E, the conduit 36/fitting 30 includes a central axis F, the conduit 38/fitting 32 includes a central axis G, and the expansion device 42 includes a central axis H. In an embodiment of the invention, the central axes E, F, G, and H intersect the junction 40 at a central point 84. In general, the central point 84 occupies a volume within the junction 40. For example, the central point 84 may be defined within about a cubic centimeter of volume. In another example, the central point 84 may be defined within about a cubic millimeter of volume. It is an advantage of this and other embodiments of the invention that freezing, partially frozen, and/or frozen fluid may flow or advance towards the expansion device 42 by virtue of the location of the central point 84 disposed within the junction 40 and the direct flow path or access to the chamber 74 from the junction 40.

In addition, the expansion device 42 may include one or more optional lock cables 86 to lock rotation of the end cap 46 relative to the housing 44. If included, the lock cables 86 reduce or prevent the end cap 46 from rotating relative to the housing 44. In this manner, the expansion device 42 may be prevented from accidental disassembly.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A freeze resistant manifold comprising:
   a plurality of conduits, each conduit including a respective first end in fluid communication with a respective second end;
   a junction defined by each of the respective first ends of the plurality of conduits being in direct fluid communication with a remainder of the first ends of the plurality of conduits; and
   an expansion device including:
      a housing having a first housing end and a second housing end, the first housing end being in fluid communication with the junction;
      an end cap attached to the second housing end and defining a first chamber having a witness port that vents to atmosphere;
      a plug disposed between the first housing end and the second housing end, the plug having a substantially fluid-tight, sliding engagement with an inner wall of the housing;
      a linear actuator to urge the plug towards the first housing end with a predetermined amount of force, the plug being held proximal to the first housing end by the linear actuator in response to a fluid pressure in the junction being less than a predetermined normal working pressure, the plug being moved towards the second housing end in response to the fluid pressure in the junction exceeding the predetermined normal working pressure to create a second chamber that is fluidly coupled to the first chamber after the plug moves a predetermined distance; and
      a guide rod extending from the plug towards the second end of the housing and through the witness port disposed in the end cap, wherein the guide rod comprises indicators for visible indication of the fluid pressure through observation of a portion of the guide rod extending outside the end cap through the witness port.

2. The freeze resistant manifold according to claim 1, further comprising:
   an O-ring disposed at an end of the plug proximal to the junction, the O-ring fitting between the plug and the inner wall of the housing;
   a cap threaded portion disposed on an inner wall of the end cap;

a housing threaded portion disposed on an outer wall of the housing, the cap threaded portion mating with the housing threaded portion;

a guide rod extending from the plug towards the second end of the housing and through the witness port disposed in the end cap; and a lock to secure the end cap to the housing.

3. The freeze resistant manifold according to claim 1, further comprising:

wherein the end cap provides a bearing surface for the linear actuator to bear upon.

4. The freeze resistant manifold according to claim 1, further comprising:

an O-ring disposed at an end of the plug proximal to the junction, the O-ring fitting between the plug and the inner wall of the housing; and a stop that arrests movement of the plug at a predetermined position in the housing and prevents the O-ring from extending into the junction.

5. The freeze resistant manifold according to claim 4, wherein the stop further comprises:

an annular bearing surface on the inner wall of the housing; and a corresponding annular bearing surface on the plug that engages the annular bearing surface on the inner wall.

6. The freeze resistant manifold according to claim 1, further comprising:

a first fitting disposed at a second end of a first conduit of the plurality conduits, the first fitting to connect the freeze resistant manifold to a fluid supply tank of an aircraft; and a second fitting disposed at a second end of a second conduit of the plurality of conduits, the second fitting to connect the freeze resistant manifold to a supply line of a fixture in the aircraft.

7. The freeze resistant manifold according to claim 1, wherein a respective central axis of each conduit and the housing intersect at a point in the junction.

8. The freeze resistant manifold according to claim 1, wherein the plurality of conduits consists of three conduits.

9. The freeze resistant manifold according to claim 1, wherein the linear actuator is a spring.

10. A fluid supply system for an aircraft, the fluid supply system comprising:

a fluid storage tank;
a main line to draw a fluid from the storage tank;
a first fixture;
a first supply line to supply the fluid to the first fixture;
a second fixture;
a second supply line to supply the fluid to the second fixture; and
a freeze resistant manifold comprising:
 a junction to directly fluidly connect the main line to the first supply line and the second supply line; and
 an expansion device including:
  a housing having a first housing end and a second housing end, the first housing end being in fluid communication with the junction;
  an end cap attached to the second housing end and defining a first chamber having a witness port that vents to atmosphere;
  a plug disposed between the first housing end and the second housing end, the plug having a substantially fluid-tight, sliding engagement with an inner wall of the housing;
  a linear actuator to urge the plug towards the first housing end with a predetermined amount of force, the plug being held proximal to the first housing end by the linear actuator in response to a fluid pressure in the junction being less than a predetermined normal working pressure, the plug being moved towards the second housing end in response to the fluid pressure in the junction exceeding the predetermined normal working pressure to create a second chamber that is fluidly coupled to the first chamber after the plug moves a predetermined distance
  a guide rod extending from the plug towards the second end of the housing and through the witness port disposed in the end cap, wherein the guide rod comprises indicators for visible indication of the fluid pressure through observation of a portion of the guide rod extending outside the end cap through the witness port.

11. The fluid supply system according to claim 10, further comprising:

an O-ring disposed at an end of the plug proximal to the junction, the O-ring fitting between the plug and the inner wall of the housing;

a cap threaded portion disposed on an inner wall of the end cap;

a housing threaded portion disposed on an outer wall of the housing, the cap threaded portion mating with the housing threaded portion; and a lock to secure the end cap to the housing.

12. The fluid supply system according to claim 10, wherein the end cap provides a bearing surface for the linear actuator to bear upon.

13. The fluid supply system according to claim 10, further comprising:

a cap threaded portion disposed on an inner wall of the end cap; and a housing threaded portion disposed on an outer wall of the housing, the cap threaded portion mating with the housing threaded portion.

14. The fluid supply system according to claim 13, further comprising:

a lock to secure the end cap to the housing.

15. The fluid supply system according to claim 10, further comprising:

an O-ring disposed at an end of the plug proximal to the junction, the O-ring fitting between the plug and the inner wall of the housing; and a stop that arrests movement of the plug at a predetermined position in the housing and prevents the O-ring from extending into the junction.

16. The fluid supply system according to claim 15, wherein the stop further comprises:

an annular bearing surface on the inner wall of the housing; and a corresponding annular bearing surface on the plug that engages the annular bearing surface on the inner wall.

17. The fluid supply system according to claim 10, wherein the linear actuator is a spring.

\* \* \* \* \*